(12) United States Patent
Millar

(10) Patent No.: US 10,905,059 B2
(45) Date of Patent: Feb. 2, 2021

(54) SYSTEMS AND METHODS FOR REMOVING FLUID FROM A TRAY IN AN ASSEMBLY LINE GROW POD

(71) Applicant: Grow Solutions Tech LLC, Lehi, UT (US)

(72) Inventor: Gary Bret Millar, Highland, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 438 days.

(21) Appl. No.: 15/983,210

(22) Filed: May 18, 2018

(65) Prior Publication Data

US 2018/0359971 A1    Dec. 20, 2018

Related U.S. Application Data

(60) Provisional application No. 62/519,397, filed on Jun. 14, 2017, provisional application No. 62/519,395, filed on Jun. 14, 2017, provisional application No. 62/519,304, filed on Jun. 14, 2017.

(51) Int. Cl.
    *A01G 31/04* (2006.01)
(52) U.S. Cl.
    CPC .................. *A01G 31/042* (2013.01)
(58) Field of Classification Search
    CPC .... A01G 31/042; A01G 31/045; A01G 31/02; A01G 9/247
    See application file for complete search history.

(56) References Cited

U.S. PATENT DOCUMENTS

| 3,578,431 | A | * | 5/1971 | Ingestad | A01G 31/02 71/1 |
|---|---|---|---|---|---|
| 3,945,148 | A | | 3/1976 | Oyama | |
| 4,245,433 | A | * | 1/1981 | Sjostedt | A01G 31/02 47/59 R |

(Continued)

FOREIGN PATENT DOCUMENTS

| CN | 203327640 U | 12/2013 |
|---|---|---|
| CN | 206462062 U | 9/2017 |

(Continued)

OTHER PUBLICATIONS

International Search Report and Written Opinion dated Aug. 13, 2018, pertaining to International Application PCT/US2018/033598, filed May 21, 2018, 14 pages.

*Primary Examiner* — Magdalena Topolski
*Assistant Examiner* — Morgan T Barlow
(74) *Attorney, Agent, or Firm* — Dinsmore & Shohl LLP

(57) ABSTRACT

A fluid removal system for an assembly line grow pod is provided. The fluid removal system includes a track, a cart configured to move on the track, a fluid removal manifold provided over the track, and a controller. The cart includes one or more cells. The fluid removal manifold includes a body, and one or more nozzles attached to the body. The controller determines whether fluid in the cart needs to be removed, operates the fluid removal manifold to align the one or more nozzles with the one or more cells of the cart in response to determination that the fluid in the cart needs to be removed, and instructs the fluid removal manifold to remove fluid from one or more cells of the cart through the one or more nozzles.

20 Claims, 10 Drawing Sheets

(56) References Cited

U.S. PATENT DOCUMENTS

| | | | | |
|---|---|---|---|---|
| 5,611,172 | A * | 3/1997 | Dugan | A01G 7/00 47/1.01 R |
| 6,279,263 | B1 * | 8/2001 | Lai | A01G 31/02 47/65 |
| 7,594,355 | B1 | 9/2009 | Aagaard | |
| 9,095,833 | B2 | 8/2015 | Demmitt | |
| 9,795,097 | B2 | 10/2017 | Williams et al. | |
| 10,136,587 | B1 * | 11/2018 | Johnson | A01G 7/02 |
| 2006/0027283 | A1 * | 2/2006 | Gauthier | A01G 27/008 141/95 |
| 2011/0219685 | A1 * | 9/2011 | Goldman | A01G 27/006 47/58.1 R |
| 2012/0005957 | A1 * | 1/2012 | Downs, Sr. | A01G 31/02 47/62 A |
| 2015/0173309 | A1 | 6/2015 | Golgotiu et al. | |
| 2015/0208598 | A1 | 7/2015 | Kern | |
| 2015/0216116 | A1 * | 8/2015 | Hirai | A01C 11/00 47/1.01 P |
| 2016/0128289 | A1 * | 5/2016 | Wong | G05B 19/041 47/62 A |
| 2018/0014475 | A1 * | 1/2018 | Gomi | A01G 9/18 |
| 2019/0021238 | A1 * | 1/2019 | Alexander | A01G 31/042 |

FOREIGN PATENT DOCUMENTS

| | | | |
|---|---|---|---|
| CN | 206517889 U | 9/2017 | |
| WO | 2007/095110 A2 | 8/2007 | |
| WO | WO-2011007928 A1 * | 1/2011 | A01G 7/06 |

\* cited by examiner

SYSTEMS AND METHODS FOR REMOVING FLUID FROM A TRAY IN AN ASSEMBLY LINE GROW POD

CROSS REFERENCE TO RELATED APPLICATIONS

This application claims the benefit of U.S. Provisional Patent Application Nos. 62/519,397, 62/519,395, and 62/519,304 all filed on Jun. 14, 2017, the entire contents of which are herein incorporated by reference.

TECHNICAL FIELD

Embodiments described herein generally relate to systems and methods for removing fluid from a tray in an assembly line grow pod and, more specifically, to removing excessive water in a cart moving in an assembly line grow pod.

BACKGROUND

While crop growth technologies have advanced over the years, there are still many problems in the farming and crop industry today. As an example, while technological advances have increased efficiency and production of various crops, many factors may affect a harvest, such as weather, disease, infestation, and the like. Additionally, while the United States currently has suitable farmland to adequately provide food for the U.S. population, other countries and future populations may not have enough farmland to provide the appropriate amount of food.

Providing proper amounts of water in hydroponic cultivation is important. In addition, contaminated water or plants needs to be removed from a cultivation tray. Thus, a system for removing excessive fluid or contaminants from hydroponic cultivation beds may be needed.

SUMMARY

In one embodiment, a fluid removal system for an assembly line grow pod is provided. The fluid removal system includes a track, a cart configured to move on the track, a fluid removal manifold provided over the track, and a controller. The cart includes one or more cells. The fluid removal manifold includes a body, and one or more nozzles attached to the body. The controller includes one or more processors, one or more memory modules, and machine readable instructions stored in the one or more memory modules that, when executed by the one or more processors, cause the controller to: determine whether fluid in the cart needs to be removed, operate the fluid removal manifold to align the one or more nozzles with the one or more cells of the cart in response to determination that the fluid in the cart needs to be removed, and instruct the fluid removal manifold to remove fluid from one or more cells of the cart through the one or more nozzles.

In another embodiment, a controller for removing fluid from a cart in an assembly line grow pod is provided. The controller includes one or more processors, one or more memory modules, and machine readable instructions stored in the one or more memory modules that, when executed by the one or more processors, cause the controller to: instruct the cart to move on a track; determine whether fluid in the cart needs to be removed; align one or more nozzles of a fluid removal manifold with one or more cells of the cart in response to determination that the fluid in the cart needs to be removed; and instruct the fluid removal manifold to remove fluid from the one or more cells of the cart through the one or more nozzles of the fluid removal manifold.

In another embodiment, a method for removing fluid from a cart in a grow pod system is provided. The method includes sending, by a controller of the grow pod system, an instruction for moving the cart on a track, determining, by the controller of the grow pod system, whether fluid in the cart needs to be removed, aligning, by the controller of the grow pod system, one or more nozzles of a fluid removal manifold with one or more cells of the cart in response to determination that the fluid in the cart needs to be removed, and removing, by the fluid removal manifold, fluid from the one or more cells of the cart through the one or more nozzles.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include fluid removal systems for an assembly line grow pod. The fluid removal system includes a track, a cart configured to move on the track, a fluid removal manifold provided over the track, and a controller. The cart includes one or more cells. The fluid removal manifold includes a body, and one or more nozzles attached to the body. The controller determines whether fluid in the cart needs to be removed, operates the fluid removal manifold to align the one or more nozzles with the one or more cells of the cart in response to a determination that the fluid in the cart needs to be removed, and instructs the fluid removal manifold to remove fluid from one or more cells of the cart through the one or more nozzles. The fluid removal system removes excess water and/or contaminants from carts moving in an assembly line grow pod, which enhances productivity and quality of plants grown in the assembly line grow pod. Additionally, the fluid removal system controls the level of fluid based on the type of seeds or plants carried in carts.

Figure 1:
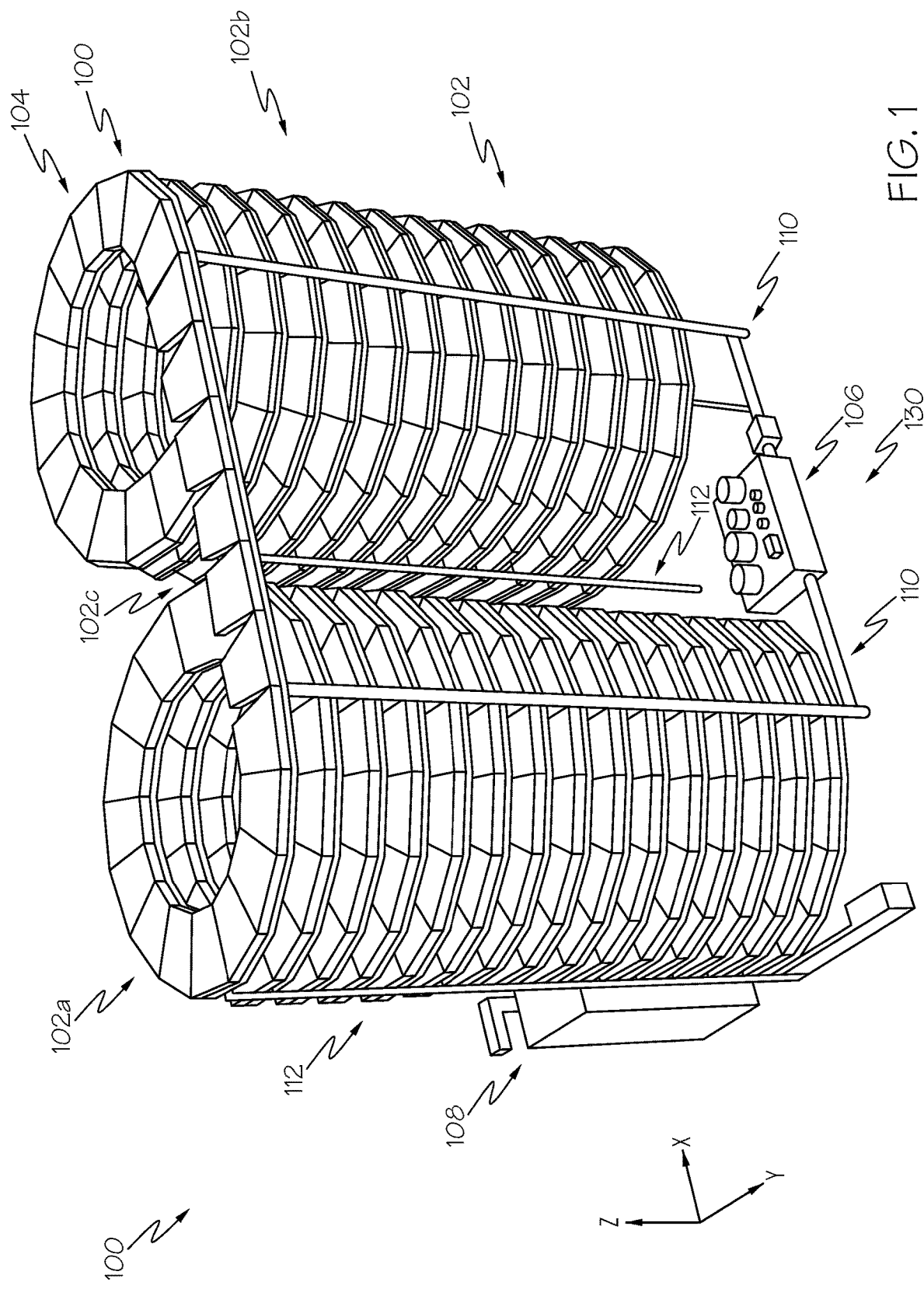
FIG. 1 depicts an assembly line grow pod, according to embodiments described herein.

Referring now to the drawings, FIG. 1 depicts an assembly line grow pod 100 that receives a plurality of industrial carts 104, according to embodiments described herein. The assembly line grow pod 100 may be positioned on an x-y plane as shown in FIG. 1. As illustrated, the assembly line grow pod 100 may include a track 102 that holds one or more industrial carts 104. Each of the one or more industrial carts 104, as described in more detail with reference to FIG. 2, may include one or more wheels 222a, 222b, 222c, and 222d rotatably coupled to the industrial cart 104 and supported on the track 102, as described in more detail with reference to FIG. 2.

Additionally, a drive motor is coupled to the industrial cart 104. In some embodiments, the drive motor may be coupled to at least one of the one or more wheels 222a, 222b, 222c, and 222d such that the industrial cart 104 may be propelled along the track 102 in response to a signal transmitted to the drive motor. In other embodiments, the drive motor may be rotatably coupled to the track 102. For example, without limitation, the drive motor may be rotatably coupled to the track 102 through one or more gears which engage a plurality of teeth arranged along the track 102 such that the industrial cart 104 may be propelled along the track 102.

The track 102 may consist of a plurality of modular track sections. The plurality of modular track sections may include a plurality of straight modular track sections and a plurality of curved modular track sections. The track 102 may include an ascending portion 102a, a descending portion 102b, and a connection portion 102c. The ascending portion 102a and the descending portion 102b may include the plurality of curved modular track sections. The ascending portion 102a may wrap around (e.g., in a counterclockwise direction as depicted in FIG. 1) a first axis such that the industrial carts 104 ascend upward in a vertical direction. The first axis may be parallel to the z axis as shown in FIG. 1 (i.e., perpendicular to the x-y plane).

The descending portion 102b may be wrapped around a second axis (e.g., in a counterclockwise direction as depicted in FIG. 1) that is substantially parallel to the first axis, such that the industrial carts 104 may be returned closer to ground level. The plurality of curved modular track sections of the descending portion 102b may be tilted relative to the x-y plane (i.e., the ground) by a predetermined angle.

The connection portion 102c may include a plurality of straight modular track sections. The connection portion 102c may be relatively level with respect to the x-y plane (although this is not a requirement) and is utilized to transfer the industrial carts 104 from the ascending portion 102a to the descending portion 102b. In some embodiments, a second connection portion (not shown in FIG. 1) may be positioned near ground level that couples the descending portion 102b to the ascending portion 102a such that the industrial carts 104 may be transferred from the descending portion 102b to the ascending portion 102a. The second connection portion may include a plurality of straight modular track sections.

In some embodiments, the track 102 may include two or more parallel rails that support the industrial cart 104 via the one or more wheels 222a, 222b, 222c, and 222d rotatably coupled thereto. In some embodiments, at least two of the parallel rails of the track 102 are electrically conductive, thus capable of transmitting communication signals and/or power to and from the industrial cart 104. In yet other embodiments, a portion of the track 102 is electrically conductive and a portion of the one or more wheels 222a, 222b, 222c, and 222d are in electrical contact with the portion of the track 102 which is electrically conductive. In some embodiments, the track 102 may be segmented into more than one electrical circuit. That is, the electrically conductive portion of the track 102 may be segmented with a non-conductive section such that a first electrically conductive portion of the track 102 is electrically isolated from a second electrically conductive portion of the track 102 which is adjacent to the first electrically conductive portion of the track 102.

The communication signals and power may further be received and/or transmitted via the one or more wheels 222a, 222b, 222c, and 222d of the industrial cart 104 and to and from various components of industrial cart 104, as described in more detail herein. Various components of the industrial cart 104, as described in more detail herein, may include the drive motor, the control device, and one or more sensors.

In some embodiments, the communication signals and power signals may include an encoded address specific to an industrial cart 104 and each industrial cart 104 may include a unique address such that multiple communication signals and power may be transmitted over the same track 102 and received and/or executed by their intended recipient. For example, the assembly line grow pod 100 system may implement a digital command control system (DCC). DCC systems encode a digital packet having a command and an address of an intended recipient, for example, in the form of a pulse width modulated signal that is transmitted along with power to the track 102.

In such a system, each industrial cart 104 includes a decoder, which may be the control device coupled to the industrial cart 104, designated with a unique address. When the decoder receives a digital packet corresponding to its unique address, the decoder executes the embedded command. In some embodiments, the industrial cart 104 may also include an encoder, which may be the control device coupled to the industrial cart 104, for generating and transmitting communications signals from the industrial cart 104, thereby enabling the industrial cart 104 to communicate with other industrial carts 104 positioned along the track 102 and/or other systems or computing devices communicatively coupled with the track 102.

While the implementation of a DCC system is disclosed herein as an example of providing communication signals along with power to a designated recipient along a common interface (e.g., the track 102) any system and method capable of transmitting communication signals along with power to and from a specified recipient may be implemented. For example, in some embodiments, digital data may be transmitted over AC circuits by utilizing a zero-cross, step, and/or other communication protocol.

Additionally, while not explicitly illustrated in FIG. 1, the assembly line grow pod 100 may also include a harvesting component, a tray washing component, and other systems and components coupled to and/or in-line with the track 102. In some embodiments, the assembly line grow pod 100 may include a plurality of lighting devices, such as light emitting diodes (LEDs). The lighting devices may be disposed on the track 102 opposite the industrial carts 104, such that the lighting devices direct light waves to the industrial carts 104 on the portion the track 102 directly below. In some embodiments, the lighting devices are configured to create a plurality of different colors and/or wavelengths of light, depending on the application, the type of plant being grown, and/or other factors. Each of the plurality of lighting devices may include a unique address such that a master controller 106 may communicate with each of the plurality of lighting devices. While in some embodiments, LEDs are utilized for this purpose, this is not a requirement. Any lighting device that produces low heat and provides the desired functionality may be utilized.

Also depicted in FIG. 1 is a master controller 106. The master controller 106 may include a computing device 130, a nutrient dosing component, a water distribution component, and/or other hardware for controlling various components of the assembly line grow pod 100. In some embodiments, the master controller 106 and/or the computing device 130 are communicatively coupled to a network 550 (as depicted and further described with reference to FIG. 7).

Coupled to the master controller 106 is a seeder component 108. The seeder component 108 may be configured to seed one or more industrial carts 104 as the industrial carts 104 pass the seeder in the assembly line. Depending on the particular embodiment, each industrial cart 104 may include a single section tray for receiving a plurality of seeds. Some embodiments may include a multiple section tray for receiving individual seeds in each section (or cell). In the embodiments with a single section tray, the seeder component 108 may detect presence of the respective industrial cart 104 and may begin laying seed across an area of the single section tray. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray is utilized with one or more of the industrial carts 104, the seeder component 108 may be configured to individually insert seeds into one or more of the sections of the tray. Again, the seeds may be distributed on the tray (or into individual cells) according to a desired number of seeds, a desired area the seeds should cover, a desired depth of seeds, etc. In some embodiments, the seeder component 108 may communicate the identification of the seeds being distributed to the master controller 106.

The watering component may be coupled to one or more water lines 110, which distribute water and/or nutrients to one or more trays at predetermined areas of the assembly line grow pod 100. In some embodiments, seeds may be sprayed to reduce buoyancy and then flooded. Additionally, water usage and consumption may be monitored, such that at subsequent watering stations, this data may be utilized to determine an amount of water to apply to a seed at that time.

Also depicted in FIG. 1 are airflow lines 112. Specifically, the master controller 106 may include and/or be coupled to one or more components that delivers airflow for temperature control, humidity control, pressure control, carbon dioxide control, oxygen control, nitrogen control, etc. Accordingly, the airflow lines 112 may distribute the airflow at predetermined areas in the assembly line grow pod 100. For example, the airflow lines 112 may extend to each story of the ascending portion 102a and the descending portion 102b.

It should be understood that while some embodiments of the track may be configured for use with a grow pod, such as that depicted in FIG. 1, this is merely an example. The track and track communications are not so limited and can be utilized for any track system where communication is desired.

Figure 2:
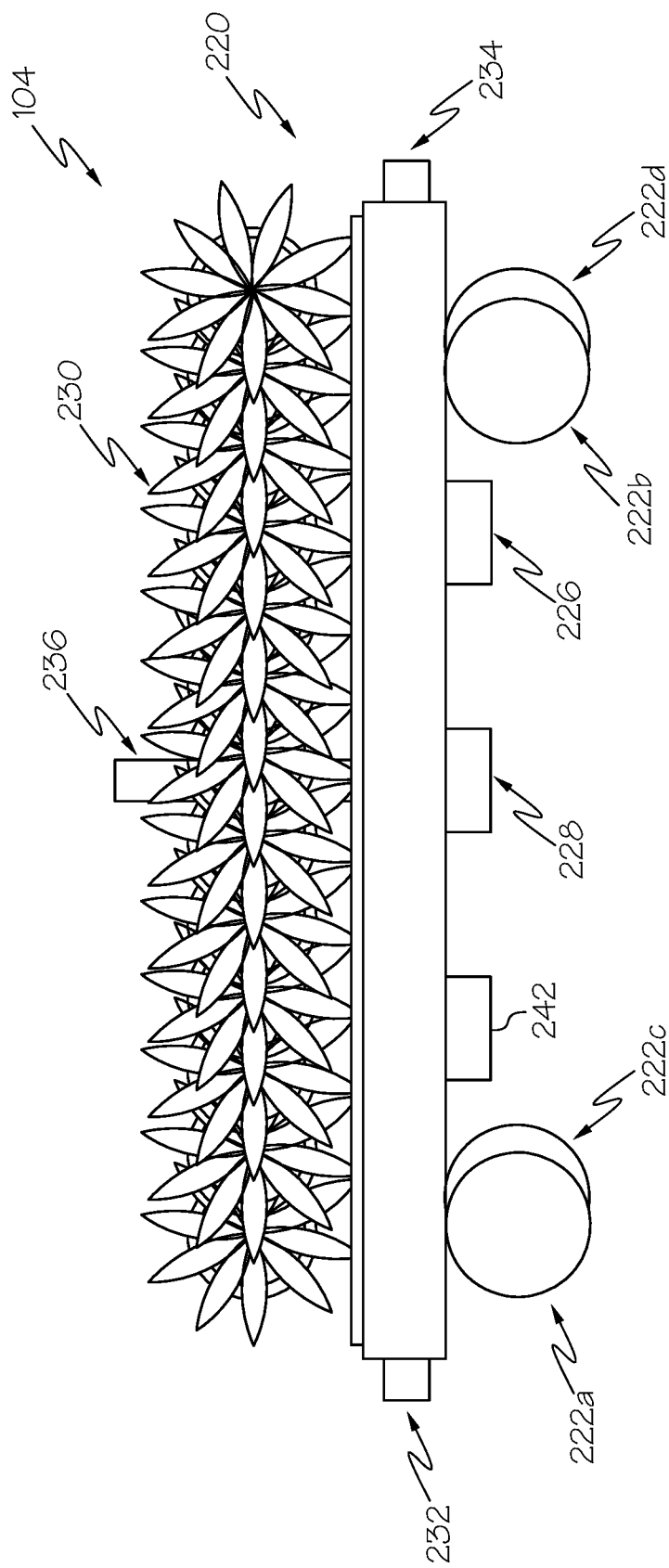
FIG. 2 depicts an industrial cart, according to embodiments described herein.

FIG. 2 depicts an industrial cart 104 that may be utilized for the assembly line grow pod 100, according to embodiments described herein. As illustrated, the industrial cart 104 includes a tray section 220 and one or more wheels 222a, 222b, 222c, and 222d. The tray section 220 includes an upper plate 220a and a lower plate 220b. The one or more wheels 222a, 222b, 222c, and 222d may be configured to rotatably couple with the track 102, as well as receive power, from the track 102. The track 102 may additionally be configured to facilitate communication with the industrial cart 104 through the one or more wheels 222a, 222b, 222c, and 222d.

In some embodiments, one or more components may be coupled to the tray section 220. For example, a drive motor 226, a cart computing device 228, and/or a payload 212 may be coupled to the tray section 220 of the industrial cart 104. The tray section 220 may additionally include a payload 212. Depending on the particular embodiment, the payload 212 may be configured as plants (such as in an assembly line grow pod 100); however this is not a requirement, as any payload 212 may be utilized.

The drive motor 226 may be configured as an electric motor and/or any device capable of propelling the industrial cart 104 along the track 102. For example, without limitation, the drive motor 226 may be configured as a stepper motor, an alternating current (AC) or direct current (DC) brushless motor, a DC brushed motor, or the like. In some embodiments, the drive motor 226 may comprise electronic circuitry which may adjust the operation of the drive motor 226 in response to a communication signal (e.g., a command or control signal) transmitted to and received by the drive motor 226. The drive motor 226 may be coupled to the tray section 220 of the industrial cart 104 or directly coupled to the industrial cart 104.

In some embodiments, the cart computing device 228 may control the drive motor 226 in response to a leading sensor 232, a trailing sensor 234, and/or an orthogonal sensor 236 included on the industrial cart 104. Each of the leading sensor 232, the trailing sensor 234, and the orthogonal sensor 236 may comprise an infrared sensor, visual light sensor, an ultrasonic sensor, a pressure sensor, a proximity sensor, a motion sensor, a contact sensor, an image sensor, an inductive sensor (e.g., a magnetometer) or other type of sensor. The industrial cart 104 further comprises a weight sensor 242 configured to measure the payload 212 on the industrial cart 104.

Figure 6:
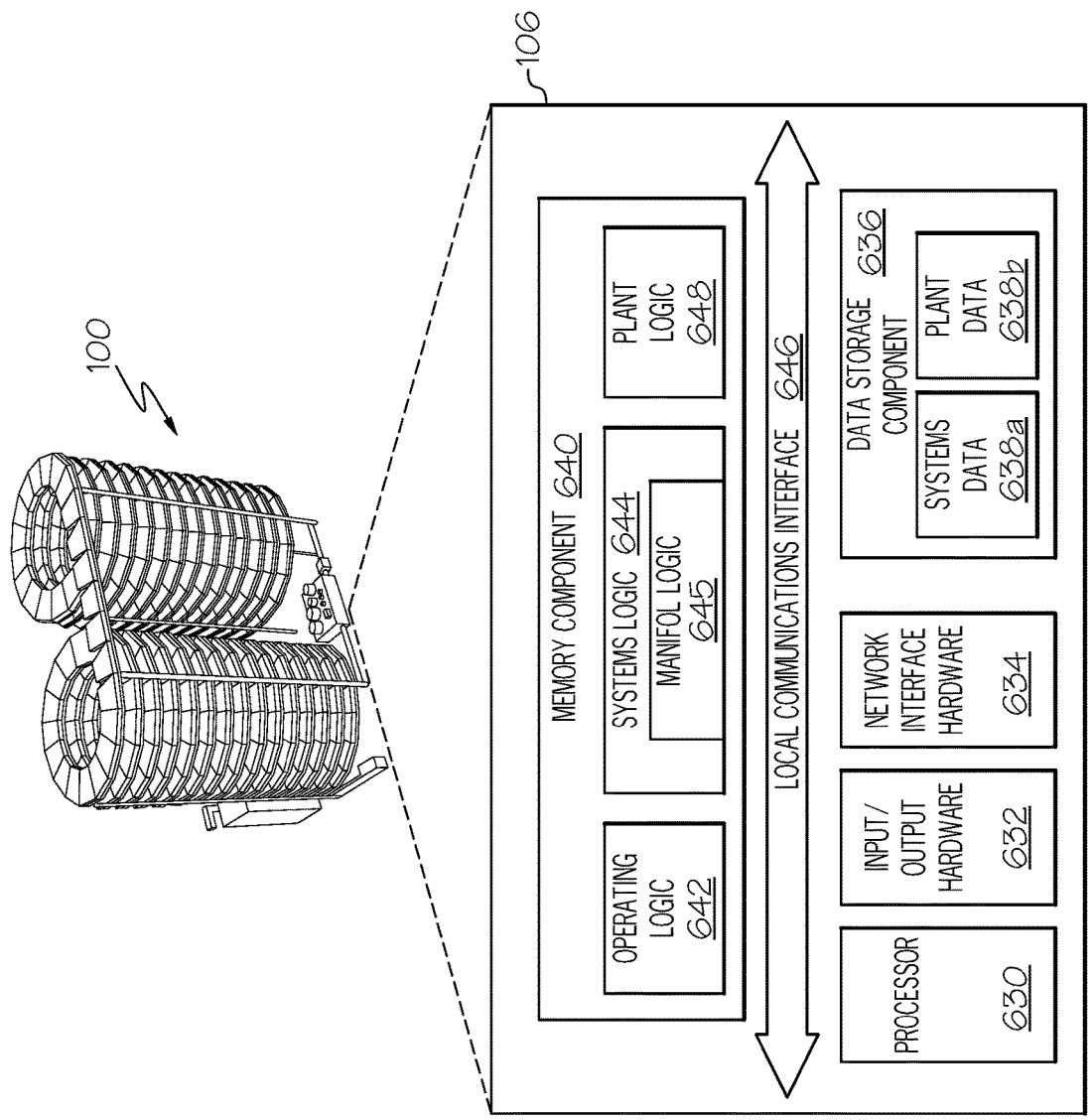
FIG. 6 depict a schematic diagram of a controller for a fluid removal manifold, according to embodiments described herein.

In some embodiments, the leading sensor 232, the trailing sensor 234, the orthogonal sensor 236 and/or the weight sensor 242 may be communicatively coupled to the master controller 106 (FIG. 1). In some embodiments, for example, the leading sensor 232, the trailing sensor 234, the orthogonal sensor 236 and/or the weight sensor 242 may generate one or more signals that may be transmitted via the one or more wheels 222a, 222b, 222c, and 222d and the track 102 (FIG. 1). In some embodiments, the track 102 and/or the industrial cart 104 may be communicatively coupled to a network 550 (FIG. 6). Therefore, the one or more signals may be transmitted to the master controller 106 via the network 550 over network interface hardware 734 (FIG. 7) or the track 102 and in response, the master controller 106 may return a control signal to the drive motor 226 for controlling the operation of one or more drive motors 226 of one or more industrial carts 104 positioned on the track 102.

In some embodiments, location markers 224 (FIG. 3) may be placed along the track 102 or the supporting structures to the track 102 at pre-defined intervals. The orthogonal sensor 236, for example, without limitation, comprises a photo-eye type sensor and may be coupled to the industrial cart 104 such that the photo-eye type sensor may view the location markers 224 positioned along the track 102 below the industrial cart 104. As such, the cart computing device 228 and/or master controller 106 may receive one or more signals generated from the photo-eye in response to detecting a location marker 224 as the industrial cart travels along the track 102. The cart computing device 228 and/or master controller 106, from the one or more signals, may determine the speed of the industrial cart 104. The speed information may be transmitted to the master controller 106 via the network 550 over network interface hardware 634 (FIG. 6).

Figure 3:
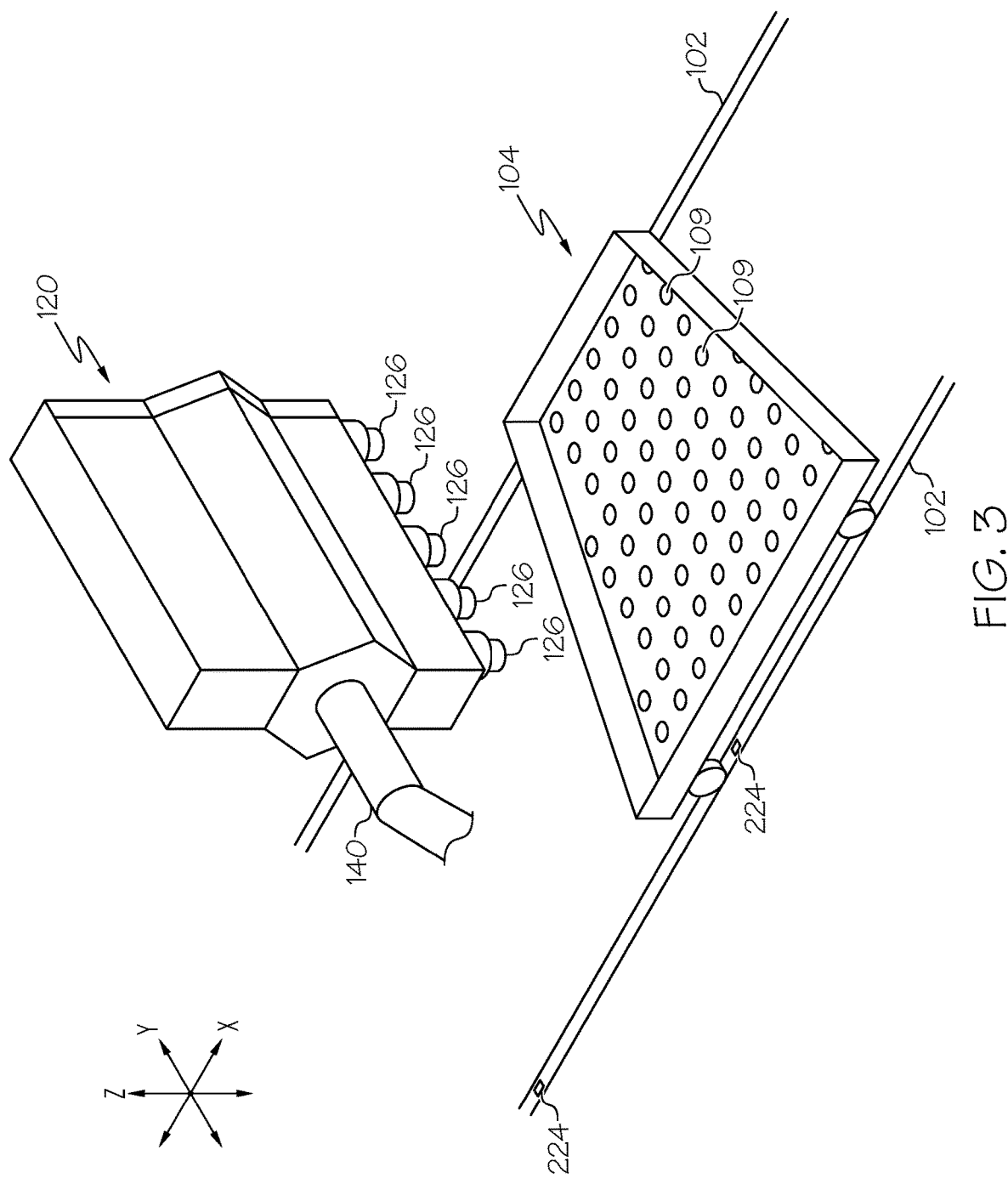
FIG. 3 depicts a fluid removal manifold operating on an industrial cart, according to embodiments described herein.

FIG. 3 depicts an operation of removing fluid from the industrial cart 104 that may be utilized for the assembly line grow pod 100, according to embodiments described herein. As illustrated in FIG. 3, the industrial cart 104 moves on the track 102. A fluid removal manifold 120 may be positioned over the industrial cart 104. The fluid removal manifold 120 may be connected to a robot arm 140 which allows the fluid removal manifold 120 to move in +/− x, y and z directions. Specifically, the robot arm 140 may operate to align a plurality of nozzles 126 with a plurality of cells 109 of the industrial cart 104, which will be described in detail with reference to FIG. 4 below. In some embodiments, the robot arm 140 may be attached to the track 102 and move along the track 102. The fluid removal manifold 120 may remove fluid or other contaminants from the industrial cart 104.

In some embodiments, the fluid removal manifold 120 may be attached to the bottom of a track positioned over the track 102 shown in FIG. 3. The fluid removal manifold 120 attached to the bottom of the track may move in +/− x, y and z directions to align the nozzles 126 with the plurality of cells 109 in the industrial cart 104.

Figure 4A:
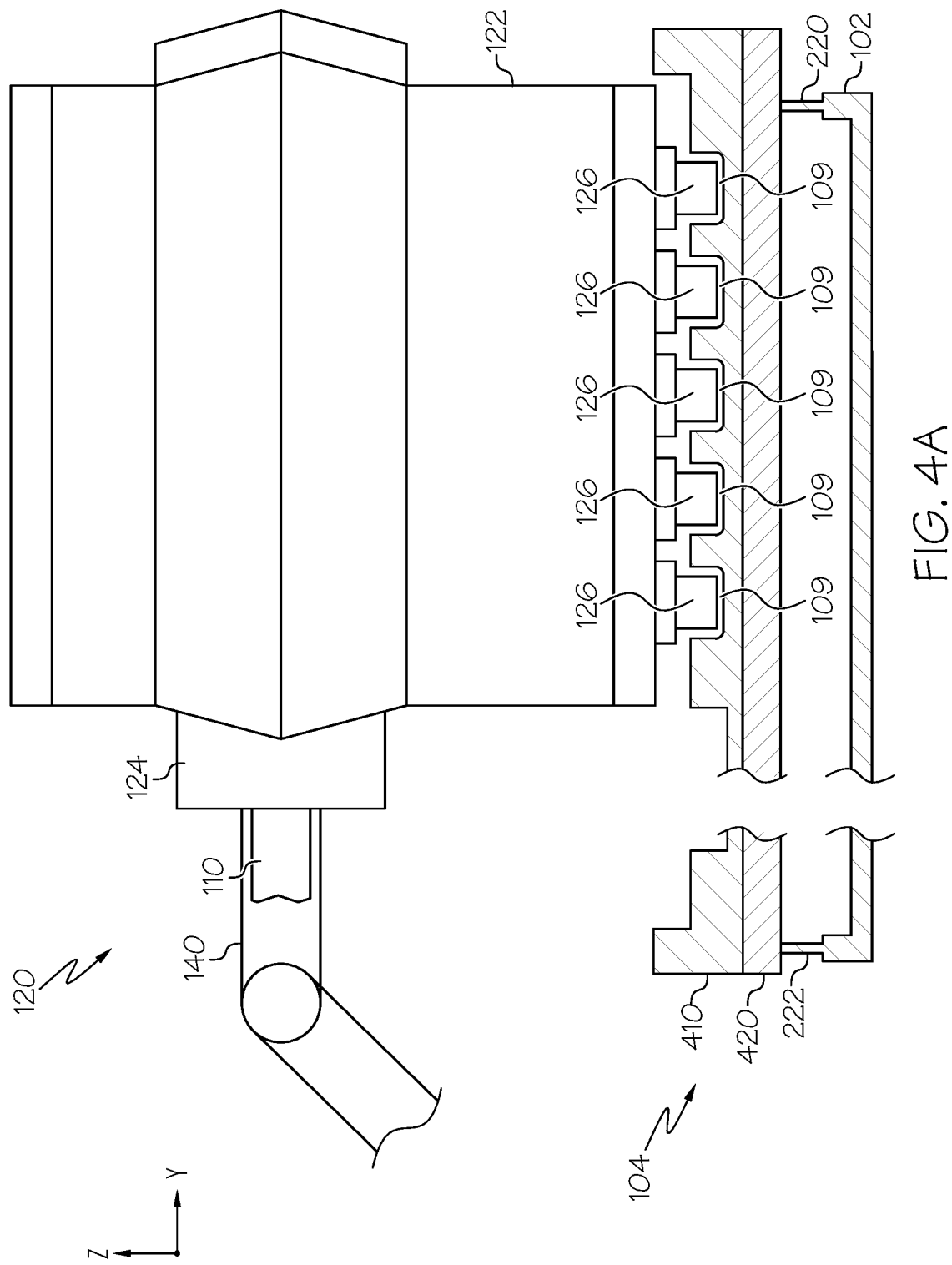
FIG. 4A depicts fluid removal manifold removing fluid from an industrial cart, according to embodiments described herein.

FIG. 4A depicts a fluid removal manifold 120 that removes fluid from cells 109 of an industrial cart 104, according to embodiments described herein. In embodiments, the industrial cart 104 may include a plurality of cells 109. The plurality of cells 109 may be rectangular-shaped cells which are configured to retain water or one or more seeds therein. As another example, the plurality of cells 109 may be in any other shapes, for example, a concave shape, a triangular shape, etc. The fluid removal manifold 120 may be connected to the robot arm 140 such that the robot arm 140 moves the fluid removal manifold 120 to be aligned with the plurality of cells 109. In some embodiments, the industrial cart 104 may include an upper plate 410 and a lower plate 420. The upper plate 410 may include the plurality of cells 109 on the top surface of the upper plate 410.

The fluid removal manifold 120 may generally be located at any location within the assembly line grow pod 100, but may be particularly located adjacent to the track 102, as described in greater detail herein. In some embodiments, the fluid removal manifold 120 may be fixed in a particular location or position relative to the track 102. That is, the fluid removal manifold 120 may not move relative to the track 102. Instead, the industrial cart 104 may move along the track 102 within the vicinity of the fluid removal manifold 120 such that the plurality of nozzles 126 are aligned or alignable with the plurality of cells 109 of the industrial cart 104.

In other embodiments, the fluid removal manifold 120 may be movable such that the location or positioning of the fluid removal manifold 120 may be changed, as depicted in FIG. 3. For example, the robot arm 140 moves the fluid removal manifold 120 such that the fluid removal manifold 120 may traverse an entire length of the industrial cart 104, traverse a portion of the track 102, and/or the like. In some embodiments, the fluid removal manifold 120 may move in the same direction as the industrial cart 104 while the fluid removal manifold 120 removes fluid from the industrial cart 104. For example, by referring to FIG. 3, both the fluid removal manifold 120 and the industrial cart 104 may move in +x direction together while the fluid removal manifold 120 removes fluid from the industrial cart 104. The fluid removal manifold 120 and the industrial cart 104 may move at the same speed.

The fluid removal manifold 120 may have a body 122 that is fluidly coupled to at least one of the one or more water lines 110 such that fluid removed from the industrial cart 104 is provided at a fluid output 124 of the fluid removal manifold 120 to the water lines 110. The fluid to be removed from the industrial cart 104 (and/or the cells 109 thereof) may be taken in by the fluid removal manifold 120 through one or more nozzles 126, as described in more detail herein. While FIG. 4A depicts five nozzles 126, the present disclosure is not limited to such. That is, the fluid removal manifold 120 may have fewer than or greater than five nozzles 126. In some embodiments, the number of nozzles 126 in the fluid removal manifold 120 may correspond to a number of cells 109 in a particular section of the industrial cart 104 such that a single nozzle 126 receives fluid from a corresponding one of the cells 109 or a group of cells 109 in the industrial cart 104.

In some embodiments, the number of nozzles 126 may correspond to the number of cells 109 or the number of cell groups that exists across a length of the industrial cart 104 (i.e., a length in y direction). For example, if the industrial cart 104 contains five cells 109 or five cell groups across the length thereof, the fluid removal manifold 120 may correspondingly contain five nozzles 126. In addition, the industrial cart 104 may contain successive rows of cells 109 or groups of cells. Accordingly, as the industrial cart 104 moves along the track 102, the nozzles 126 may successively receive fluid from each successive row as the rows pass under the nozzles 126.

The positioning of the various nozzles 126 is not limited by this disclosure, and may be positioned in any configuration. In some embodiments, the nozzles 126 may be positioned in a straight line. In other embodiments, the nozzles 126 may be positioned such that they are staggered in a particular pattern. In yet other embodiments, the nozzles 126 may be arranged in a grid pattern. In yet other embodiments, the nozzles 126 may be arranged in a honeycomb pattern.

The fluid removal manifold 120 may further be positioned such that the fluid is appropriately received by the fluid removal manifold 120 via the one or more nozzles 126 from the corresponding one or more of the cells 109 of the industrial cart 104. In some embodiments, each nozzle 126 on the fluid removal manifold 120 may receive fluid from a corresponding single cell 109 within a row of cells of the industrial cart 104. In other embodiments, each nozzle 126 on the fluid removal manifold 120 may receive fluid from a corresponding group of cells 109 of the industrial cart 104. For example, a particular nozzle 126 may be configured to receive fluid from a group of cells 109 that are clustered together such that the fluid in each cell 109 in the group of cells 109 is received via the nozzle 126. In some embodiments, each nozzle 126 may be shaped and sized such that it can be inserted within one of the cells 109 to receive the fluid therefrom. That is, the shape and/or size of the nozzle 126 may correspond to a shape and/or size of a particular cell 109.

It should be understood that in order to effectively remove fluid from the one or more cells 109 of the industrial cart 104, it may be necessary for a portion of the fluid removal manifold 120 (particularly the nozzles 126) to be in direct contact with the fluid that is to be removed. Direct contact may avoid instances where other fluid (e.g., air surrounding the nozzles 126) is drawn into the manifold instead of the intended fluid from the cells 109 and/or the industrial cart 104.

In some embodiments, the fluid removal manifold 120 may be communicatively coupled to a sensing device, such as a cell sensor or the like, that detects an amount of fluid remaining in a cell 109 as a result of operation of the fluid removal manifold 120. As such, if the fluid is not appropriately removed by the fluid removal manifold 120 (e.g., due to misalignment, leaks, etc.), the sensing device will detect the lack of fluid removal from the cell 109 and transmit a signal such that corrective action can be taken.

Figure 4B:
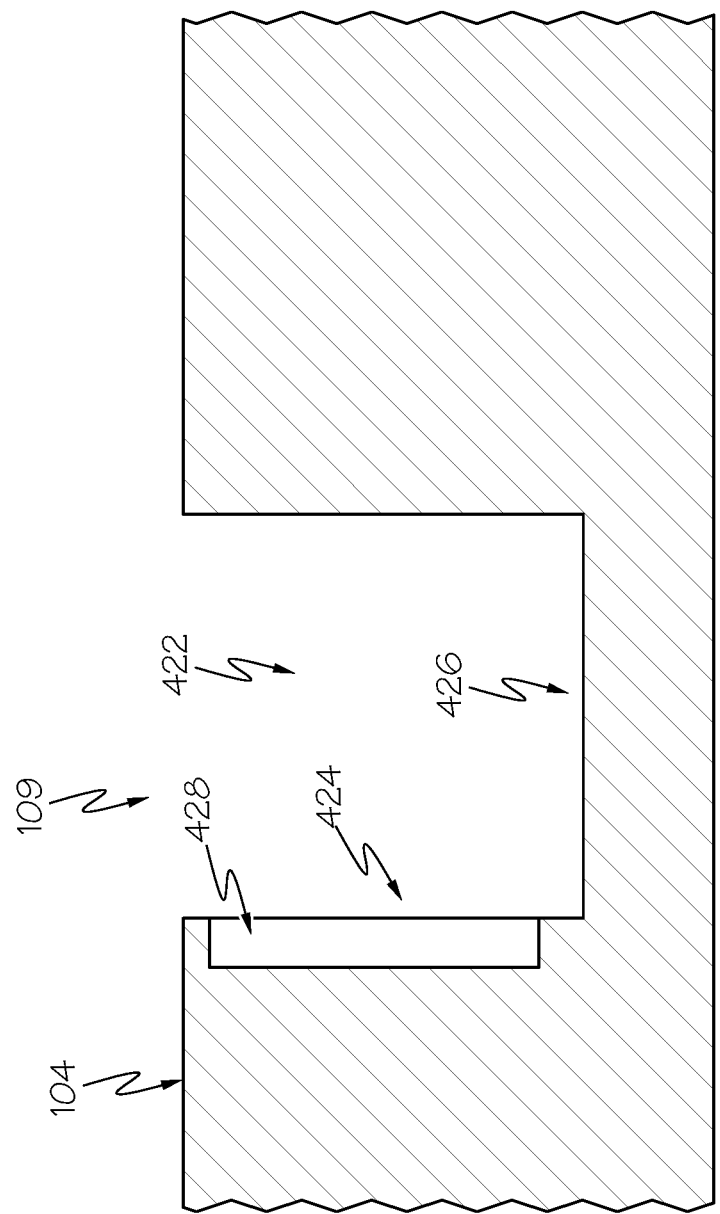
FIG. 4B depicts a cell of an industrial cart, according to embodiments described herein.

FIG. 4B depicts a cross-sectional side view of an illustrative cell 109 within the industrial cart 104. The cell 109 has one or more side walls 424 and a base 426 that defines a cavity 422 in which seeds and/or water can be deposited. The shape and size of each cell 109 is not limited by this disclosure, and may generally be any shape and/or size suitable for holding a seed, water, and/or nutrients therein, as well as any plant that sprouts from the seed before it is harvested. It should be understood that certain cells 109 may be shaped and/or sized for particular types of seeds and/or plants held therein.

Each cell 109 may be coupled to a device that measures various characteristics of the contents of the cell 109 such that a determination may be made as to whether the cell contains contaminants therein, such as the contaminants listed hereinabove. Accordingly, one of the one or more side walls 424 of the cell may be coupled to (or embedded with) a fluid sensor 428. The fluid sensor 428 may be a circuit board or the like that contains various components, traces, and/or the like for testing for one or more indicators of a presence of moisture within the cell 109. The fluid sensor 428 may transmit data about the presence of moisture within the cell 109 to the master controller 106.

While only a single fluid removal manifold 120 is depicted in FIG. 4A, it should be understood that the assembly line grow pod 100 (FIG. 1) may include a plurality of fluid removal manifolds distributed at various locations throughout. In some embodiments, a fluid removal manifold 120 may be positioned at any location within the assembly line grow pod 100 (FIG. 1) where it may be desired to remove water, nutrients, and/or contaminants from the industrial carts 104 as they are moved on the track 102. For example, a fluid removal manifold 120 may be placed adjacent to the track 102 at a location designated as a fluid removal station within the assembly line grow pod 100 (FIG. 1). In another example, a fluid removal manifold 120 may move on the fly to a location of an industrial cart 104 as soon as an excess amount of water, nutrients, or contaminants are detected within the industrial cart 104 such that the issue can be resolved as quickly as possible. In yet another example, a fluid removal manifold 120 may be positioned near a watering manifold or integrated with a watering manifold.

Figure 4C:
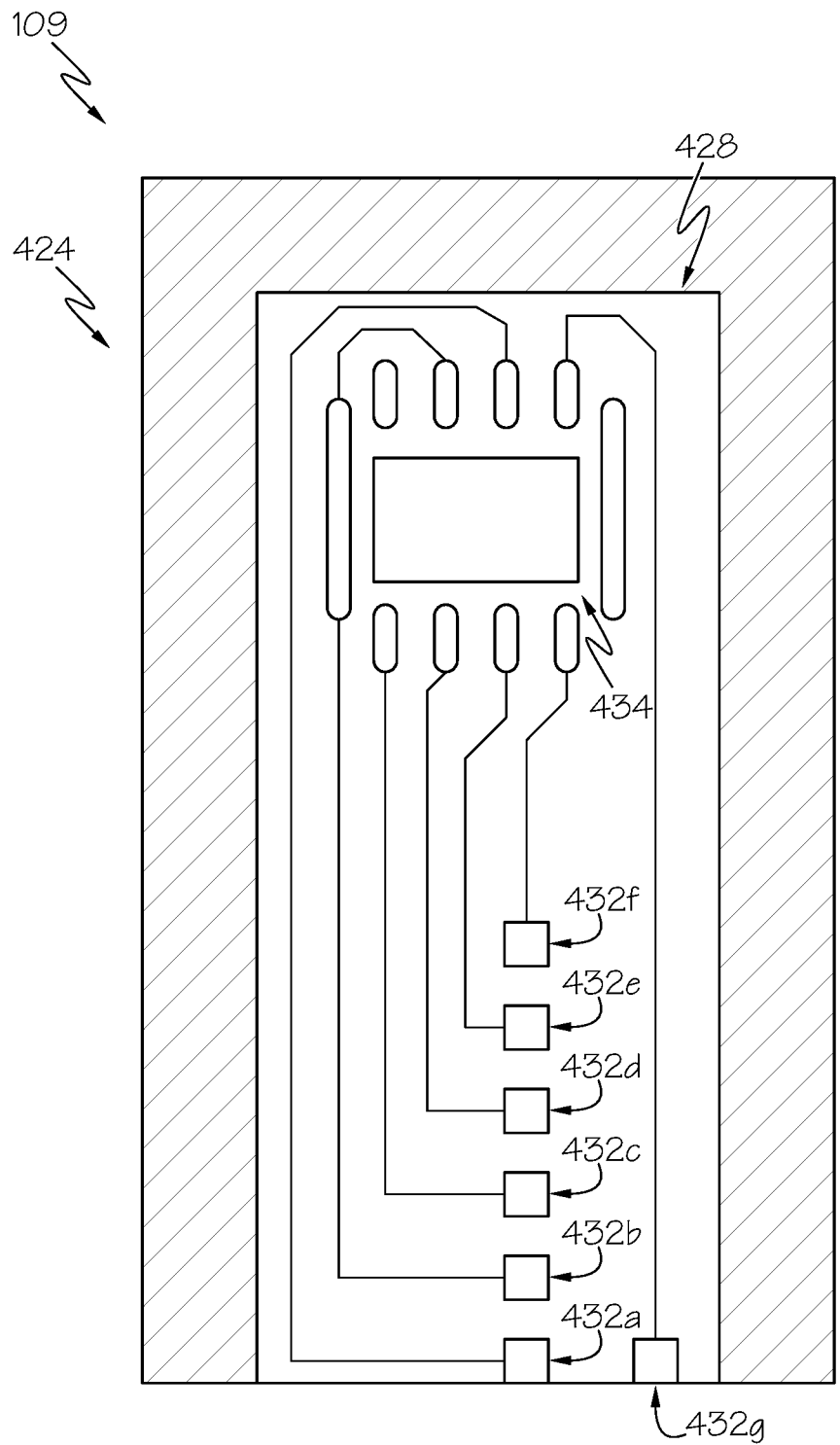
FIG. 4C depicts a fluid sensor in a cell of an industrial cart, according to embodiments described herein.

FIG. 4C depicts a fluid sensor 428 within a cell 109 according to embodiments described herein. The fluid sensor 428 may be a circuit board or the like that contains various components, traces, and/or the like for testing a presence of fluid or an amount of fluid within the cell 109. In various embodiments, the fluid sensor 428 may include a plurality of electrodes 432a-432g (collectively, 432). The plurality of electrodes 432 may be spaced at particular locations on the fluid sensor 430 such that a water height within the cell 109 can be accurately measured, as described in greater detail herein. Each of the plurality of electrodes 432 may be constructed of an electrically conductive material, and may be electrically coupled to a power source and a sensing device 434 that is configured to sense whether a circuit has been completed between at least two of the plurality of the electrodes 432. The fluid that is used in the present disclosure generally includes water and one or more nutrients that contain a sufficient amount of electrolytes to conduct electricity. As such, when the fluid is present within the cell 109, it may complete a circuit between at least two of the plurality of electrodes 432, which, in turn, is sensed by the sensing device 434. Therefore, a first electrode 432a and a circuit completion electrode 432g may be located within the cell 109 at a location that corresponds to a minimum height within the cell 109 (e.g., a bottom of the side wall 424). That is, the first electrode 432a and the circuit completion electrode 432g may be positioned at a location within the cell 109 such that, if any fluid at all is present in the cell 109, the fluid will contact both the first electrode 432a and the circuit completion electrode 432g because the force of gravity will cause the fluid to rest at the bottom of the cell 109. Electricity may flow from the first electrode 432a, through the fluid, and into the circuit completion electrode 432g to complete a circuit, which is detected by the sensing device 434. The sensing device 434 may transmit a signal to an external device (e.g., the master controller 106 (FIG. 1)) to indicate the presence of moisture within the cell as a result of the circuit completion.

Each of the plurality of electrodes 432 may be placed at varying heights from the bottom of the cell 109 such that, as the water level rises to the height of a particular electrode, a circuit is completed and the sensing device 434 senses which electrodes are included in the circuit, determines a fluid height therefrom, and sends a corresponding signal. For example, if the fluid height rises to a height of a second electrode 432b placed above the first electrode 432a, the conductivity of the fluid will cause a circuit to complete between the first electrode 432a, the second electrode 432b, and the circuit completion electrode 432g such that electricity flowing from the first electrode 432a and the second electrode 432b flows through the fluid and is received by the circuit completion electrode 432g. The sensing device 434 may sense a completion of the circuit between the first electrode 432a, the second electrode 432b, and the circuit completion electrode 432g, determine that the level of fluid has risen to the height of the second electrode 432b, and transmit a signal corresponding to the height of the fluid to an external device, such as the master controller 106 (FIG. 1).

Once the presence and/or level of fluid in the cell 109 has been determined, a further determination may be made as to the volume of fluid in the cell 109. This may generally be completed by calculating the volume based on known dimensional characteristics of the cell and/or displacement caused by the presence of other items in the cell 109, such as a seed, plant, or the like. The determined amount of fluid within the cell 109 can be used for various purposes, such as, for example, to determine whether all of the fluid dispensed into the cell 109 was actually received by the cell 109 (e.g., to determine if an alignment issue exists), to determine whether the seed or plant has been under-watered or overwatered, to determine whether additional watering is necessary at a subsequent watering station, and/or the like. Other uses for determining the presence and/or amount of fluid in the cell 109 are also contemplated and are within the scope of the present disclosure.

In some embodiments, the fluid sensor 428 may further be used for other purposes, such as sensing various conditions of the fluid within the cell. For example, the fluid sensor 428 may measure a conductivity or resistivity of the fluid within the cell 109, which may be used to determine the presence of contaminants, mold, nutrient concentration, and/or the like.

While FIG. 4C depicts a single fluid sensor 428 located in a single cell 109, the present disclosure is not limited to such. For example, a single fluid sensor 428 may be used for one or more of the cells 109 in a tray, a group of cells 109 in a tray, or the like. In another example, a single fluid sensor 428 communicatively coupled to a plurality of electrodes 432 in each of a plurality of cells 109 may be used. Other combinations are contemplated and are within the scope of the present disclosure.

Figure 5:
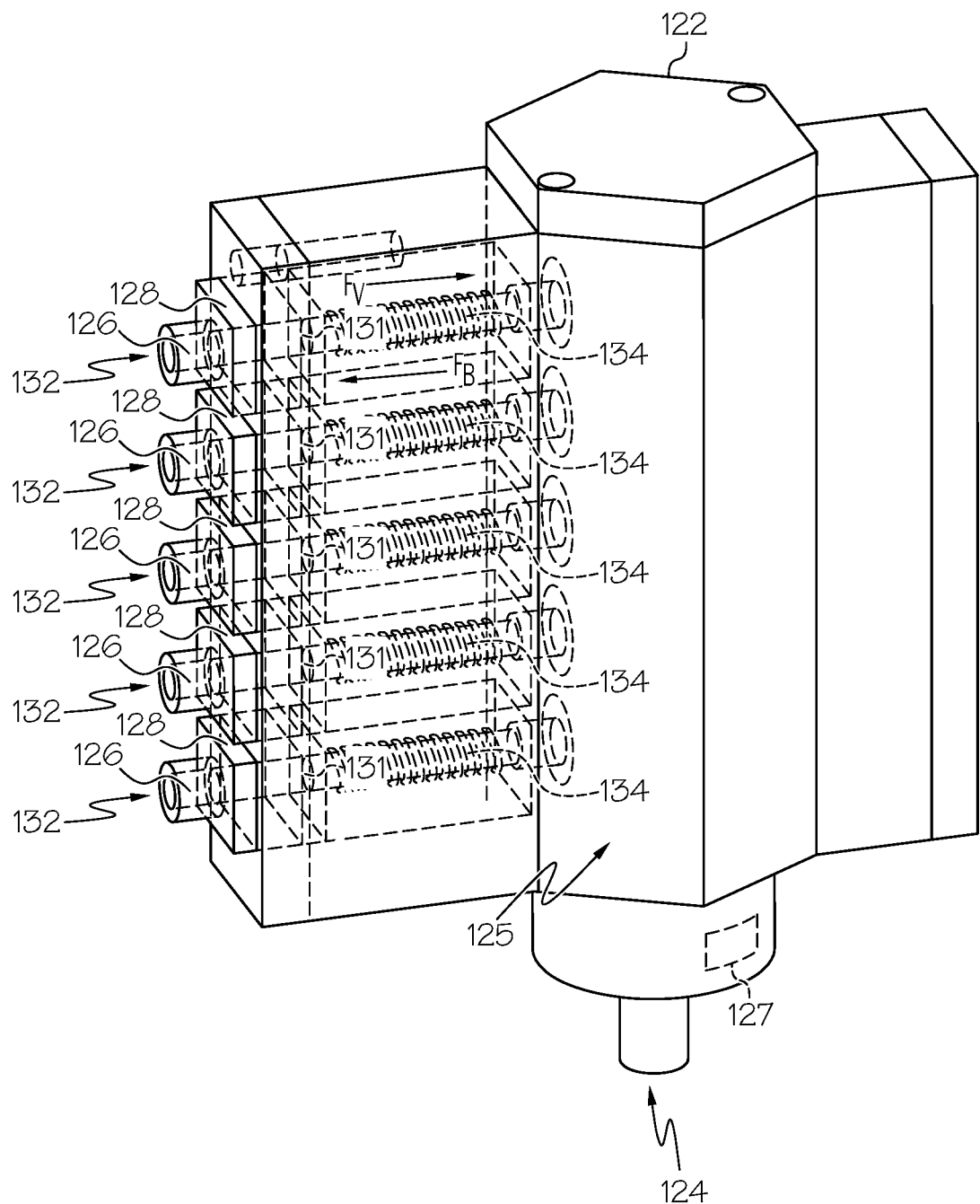
FIG. 5 depicts a fluid removal manifold, according to embodiments described herein.

FIG. 5 depicts a view of various additional components of the fluid removal manifold 120. As shown in FIG. 5, the body 122 of the fluid removal manifold 120 may define a cavity 125 therein. The cavity 125 is fluidly connected to the nozzles 126 such that fluid received from the nozzles 126 at a respective fluid input 132 is received within the cavity 125.

The fluid removal manifold 120 also includes one or more biasing assemblies 134 within the cavity 125. The one or more biasing assemblies 134 are coupled to one or more valves 131 within the cavity 125. Each of the one or more valves 131 may be coupled within a corresponding nozzle 126 such that the valves 131 control movement of fluid from the fluid inputs 132 of the nozzles 126 into the cavity 125. That is, when each valve 131 is in an open position, fluid from the fluid inputs 132 can flow past the valve 131 into the cavity 125. In addition, when each valve 131 is in a closed position, fluid from the fluid inputs 132 (or otherwise outside the fluid removal manifold 120) remains outside of the valve 131 and does not flow past the valve 131 into the cavity 125.

In various embodiments, each of the one or more valves 131 may be coupled to a corresponding biasing assembly 134, which may bias the valve 131 in the closed position. That is, the biasing assembly 134, which may be a spring or the like, may provide a biasing force $F_B$ on the corresponding valve 131 to hold the valve 131 in the closed position.

The amount of force provided by the biasing force $F_B$ on the valve 131 can be adjusted via a tension ring 128. That is, the tension ring 128 can be turned to increase or decrease the amount of force exerted by the biasing assembly 134 on the valve 131, which further increases or decreases the amount of force necessary to overcome the biasing force $F_B$ to open the valve 131. Adjustment of the amount of force exerted by the biasing assembly 134 may be completed to control when and how much fluid is allowed to pass the valve 131 into the cavity 125, as described in greater detail herein. It should be understood that each biasing assembly 134 may have a corresponding tension ring 128 such that each biasing assembly 134 can be independently adjusted for the amount of biasing force $F_B$ exerted on the valve 131. That is, a first biasing assembly 134 may be adjusted such that its corresponding first biasing force $F_B$ is greater than a second biasing force $F_B$ provided by a second biasing assembly 134.

A vacuum pump 127 may be provided within the fluid removal manifold 120 to generate a partial vacuum in the cavity 125. In some embodiments, the vacuum pump 127 may be provided external to the fluid removal manifold 120 and connected to the fluid removal manifold 120 through the fluid output 124. A partial vacuum in the cavity 125 increases a vacuum force $F_V$ on the valve 131 that is in a direction opposite of the biasing force $F_B$. That is, the pressure within the cavity 125 is decreased to create a partial vacuum that asserts the vacuum force $F_V$ on the valve 131.

When the partial vacuum reaches a particular threshold, the vacuum force $F_V$ on the valve 131 may be greater than the biasing force $F_B$ exerted by the biasing assembly 134, thereby forcing the valve 131 to the open position. Since each biasing assembly 134 can be independently adjusted to increase or decrease the biasing force $F_B$ it exerts on the corresponding valve 131, it should be understood that a particular partial vacuum causing a particular vacuum force $F_V$ may result in overcoming the biasing force $F_B$ of certain biasing assemblies 134, but not others. This may allow for each of the valves 131 to be opened independently of one another based on the amount of negative pressure within the cavity 125.

In operation, a partial vacuum is created within the cavity 125. The partial vacuum may be created, for example, by removing fluid (e.g., air) from the cavity via one or more fluid removal ports (not shown) and/or via the fluid output 124 using the vacuum pump 127. The partial vacuum may generally be increased (i.e., the pressure may be increasingly negative) until the vacuum force $F_V$ causes one or more of the valves 131 to open and allow fluid and/or other materials to pass therethrough, through the nozzle 126 and into the cavity 125. Fluid and/or other materials received within the cavity 125 may further be drained out of the cavity 125 via the fluid output 124 and/or one or more additional waste outputs (not shown).

Fluid flowing past a valve 131 can cease by decreasing the vacuum within the cavity 125 until the biasing force $F_B$ causes the valve 131 to close. Operation of such a fluid removal manifold 120 may be advantageous over fluid removal systems that utilize other components because the fluid removal manifold 120 is capable of removing a precise amount of fluid from the fluid inputs 132 via the nozzles 126 without causing excess fluid to remain within certain portions thereof, which could potentially drip back into the industrial cart 104 and/or the one or more cells 109 therein, thereby causing overwatering, delivery of excess nutrients to the seeds or plants located therein, and/or ineffective removal of contaminants.

As previously described herein, fluid and/or other materials that are taken into the cavity 125 may be drained out of the cavity 125 via the fluid output 124 and/or one or more additional waste outputs. Such fluid and/or other materials may be collected within a collection tank, reservoir, or the like for treatment, disposal, and/or reuse.

Control of the various components of the fluid removal manifold 120, including, for example, controlling the amount of vacuum created within the cavity 125 by way of the fluid output 124, the amount of tension provided to each biasing assembly 134 by wave of the tension ring 128, and/or the like may be completed, for example, by using a computing environment. FIG. 6 depicts a computing environment for an assembly line grow pod 100 including the fluid removal manifold (not shown), according to embodiments described herein. As previously described herein, the assembly line grow pod 100 may include a master controller 106, which may include a computing device that controls the manifold, among other components.

The master controller 106 may also include a processor 630, input/output hardware 632, the network interface hardware 634, a data storage component 636 (which stores systems data 638a (including manifold data), plant data 638b, and/or other data), and a memory component 640. The memory component 640 stores operating logic 642, systems logic 644, and plant logic 648. As described in more detail below, the systems logic 644 may monitor and control operations of one or more of the components of the assembly line grow pod 100. The systems logic 644 may also include manifold logic 645. As described in more detail herein, the manifold logic 645 may monitor and control operations of the fluid removal manifold 120 and/or one or more components thereof. The plant logic 648 may be configured to determine and/or receive a recipe for plant growth and may facilitate implementation of the recipe via the systems logic 644. The memory component 640 may be configured as volatile and/or nonvolatile memory and as such, may include random access memory (RAM) (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device and/or external to the computing device.

The memory component 640 may store the operating logic 642, the systems logic 644 (including the manifold logic 645), and the plant logic 648. The systems logic 644 and the plant logic 648 may each include a plurality of different pieces of logic, each of which may be embodied as a computer program, firmware, and/or hardware, as an example. A local communication interface 646 is also included in FIG. 6 and may be implemented as a bus or other communication interface to facilitate communication among the components of the computing device.

The processor 630 may include any processing component operable to receive and execute instructions (such as from a data storage component 636 and/or the memory component 640). The input/output hardware 632 may include and/or be configured to interface with microphones, speakers, a display, and/or other hardware.

The network interface hardware 634 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device and other computing devices, such as a user computing device and/or a remote computing device, as described in greater detail herein.

The operating logic 642 may include an operating system and/or other software for managing components of the computing device. As also discussed above, the systems logic 644, the manifold logic 645, and the plant logic 648 may reside in the memory component 640 and may be configured to perform various functionality of the components described herein.

It should be understood that while the components in FIG. 6 are illustrated as residing within the computing device, this is merely an example. In some embodiments, one or more of the components may reside external to the computing device. It should also be understood that, while the computing device is illustrated as a single device, this is also merely an example. In some embodiments, the systems logic 644, the manifold logic 645, and the plant logic 648 may reside on different computing devices.

Additionally, while the computing device is illustrated with the systems logic 644, the manifold logic 645, and the plant logic 648 as separate logical components, this is also an example. In some embodiments, a single piece of logic (and/or or several linked modules) may cause the computing device to provide the described functionality.

Figure 7:
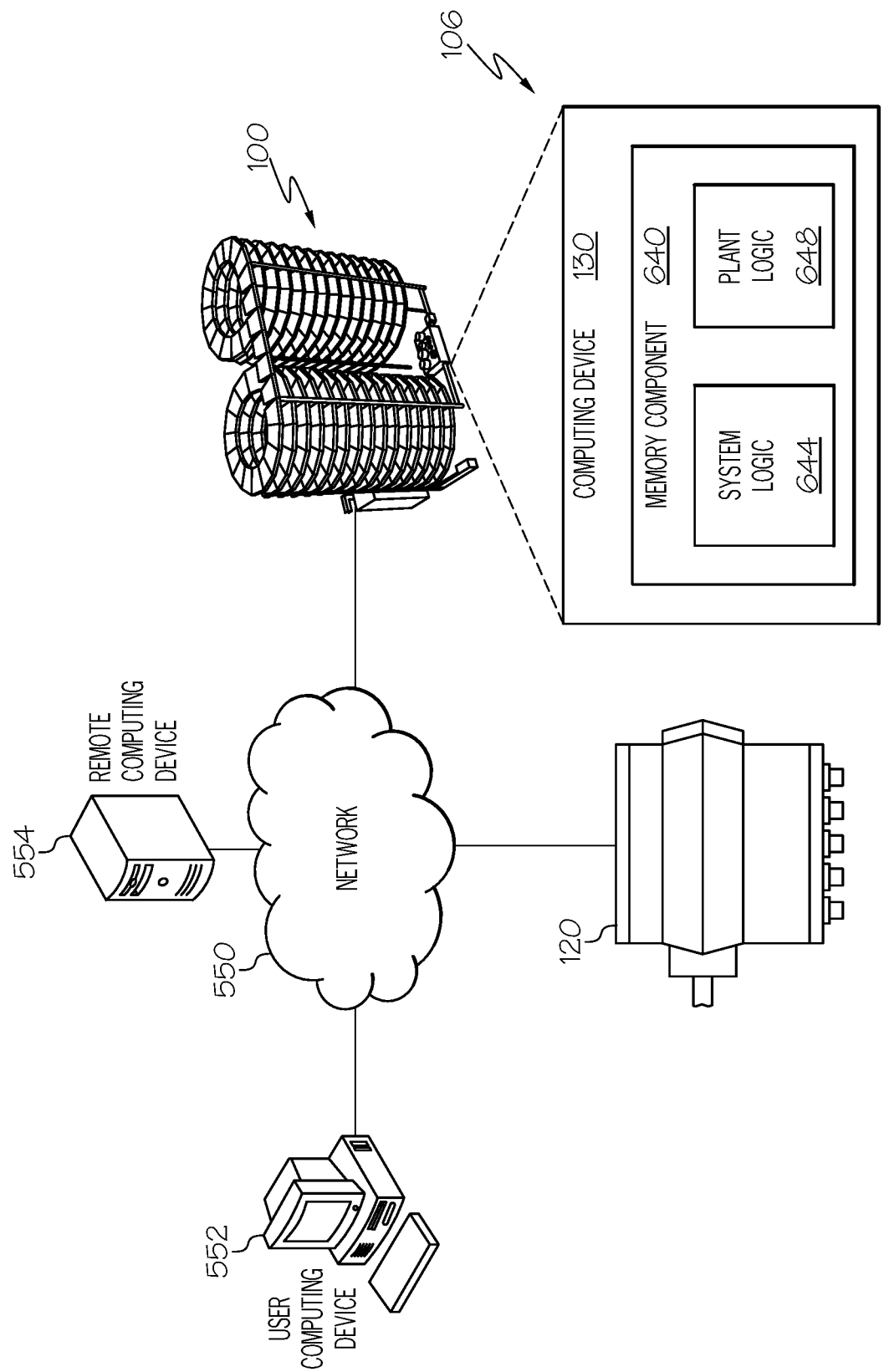
FIG. 7 depict a fluid removing system, according to embodiments described herein.

FIG. 7 depicts a computing environment for an assembly line grow pod 100, according to embodiments described herein. As illustrated, the assembly line grow pod 100 may include a master controller 106, which may include a computing device 130. The computing device 130 may include a memory component 640, which stores systems logic 644 and plant logic 648. As described above, the systems logic 644 may monitor and control operations of one or more of the components of the assembly line grow pod 100. The plant logic 648 may be configured to determine and/or receive a recipe for plant growth and may facilitate implementation of the recipe via the systems logic 644.

Additionally, the assembly line grow pod 100 is coupled to a network 550. The network 550 may include the internet or other wide area network, a local network, such as a local area network, a near field network, such as Bluetooth or a near field communication (NFC) network. The network 550 is also coupled to a user computing device 552 and/or a remote computing device 554. The user computing device 552 may include a personal computer, laptop, mobile device, tablet, server, etc. and may be utilized as an interface with a user. As an example, a user may send a recipe to the computing device for implementation by the assembly line grow pod 100, which may further include implementation by the fluid removal manifold 120. Another example may include the assembly line grow pod 100 (including the fluid removal manifold) sending notifications to a user of the user computing device 552.

Similarly, the remote computing device 554 may include a server, personal computer, tablet, mobile device, etc. and may be utilized for machine to machine communications. As an example, if the assembly line grow pod 100 determines various conditions of a particular tray (such as amount of water, nutrients, and/or presence of contaminants therein), the computing device may communicate with the remote computing device 554 to retrieve a previously stored recipe for those conditions, which may include various fluid removal manifold settings to ensure an appropriate amount of water, nutrients, and/or contaminants are removed by the fluid removal manifold. As such, some embodiments may utilize an application program interface (API) to facilitate this or other computer-to-computer communications.

In embodiments, the fluid removal manifold 120 may be coupled to a network 550, and communicate with the master controller 106, the user computing device 552, and/or the remote computing device 554.

Figure 8:
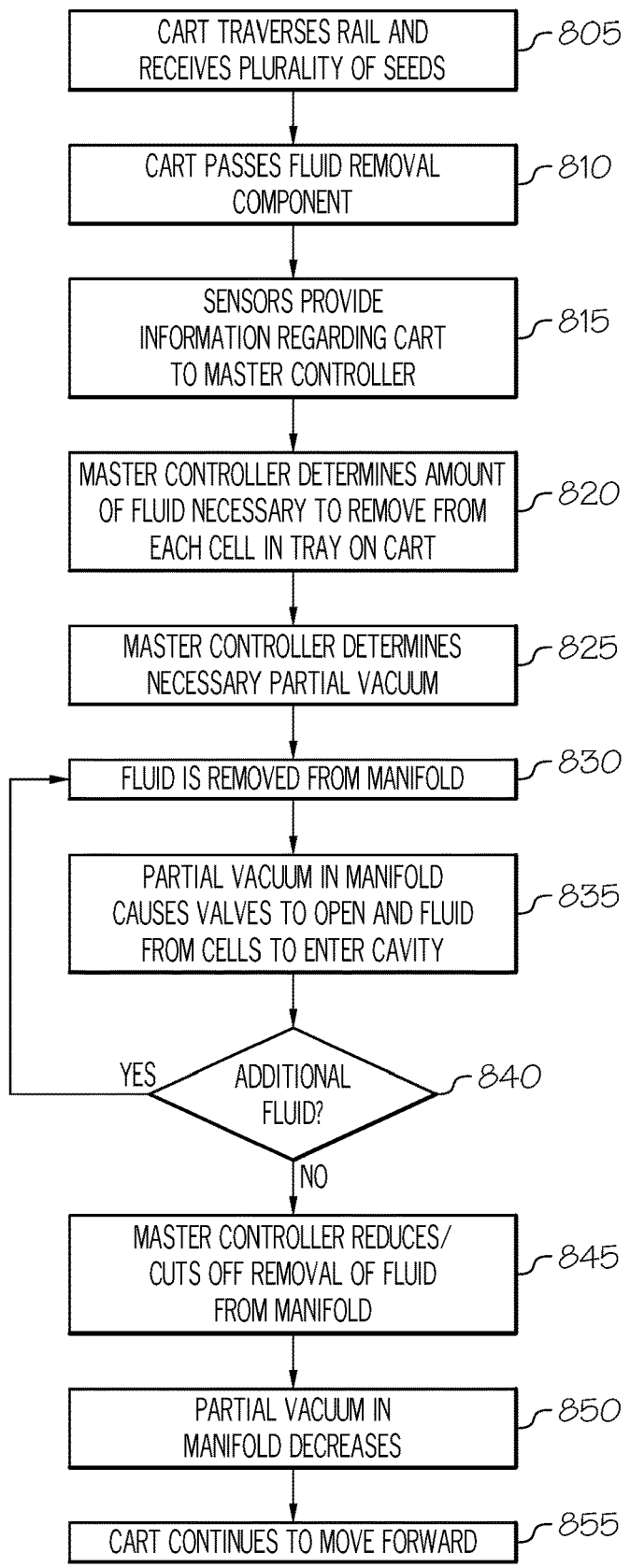
FIG. 8 depicts a flowchart for removing fluid from a cart in an assembly line grow pod, according to embodiments described herein.

FIG. 8 depicts a flowchart for operating a fluid removal manifold in an assembly line grow pod, according to embodiments described herein. As illustrated in block 805, an industrial cart 104 traversing the track 102 receives a plurality of seeds for growth from a seeding component.

In block 810, the industrial cart 104 passes a fluid removal component for removing excess fluid, including water, nutrients, and contaminants. For example, as illustrated in FIG. 3, the industrial cart 104 moves under the fluid removal manifold 120. The industrial cart 104 may carry seeds and/or water within the tray of the industrial cart 104.

In block 815, sensors provide information regarding the industrial cart 104 to the master controller 106. For example, the fluid sensor 428 depicted in FIGS. 4B and 4C transmits the level of water in one or more of the cells 109 to the master controller 106. In response to receiving data from the fluid sensor 428, the master controller 106 may determine the amount of fluid necessary to remove from the industrial cart 104, in block 820. For example, the master controller 106 compares the level of water in the cell 109 with a predetermined level of water for the seed carried in the industrial cart 104. The master controller 106 may identify the seed carried in the industrial cart 104. For example, the master controller 106 may communicate with the cart and receive information about the seed in the cart 104. As another example, the information about the plant in the cart 104 may be pre-stored in the master controller 106 when the seeder component 108 provides seeds in the carts 104. Then, the master controller 106 may retrieve a predetermined level of water for the identified seed. The predetermined level of water for the seed may be stored in the plant logic 648 (FIG. 6) and the master controller 106 may retrieve the predetermined level of water based on the seed carried in the industrial cart 104.

In block 825, the master controller 106 determines the necessary partial vacuum needed inside the fluid removal manifold 120 to achieve necessary fluid removal. This accounts for the amount of biasing force that is being applied by each of the biasing assemblies and may further include directing a change in the amount of biasing force to ensure appropriate fluid removal.

In block 830, fluid is removed from the fluid removal manifold 120 to create the partial vacuum that is determined in block 825. The vacuum pressure in the fluid removal manifold 120 causes the valves 131 to open, which allows fluid from the cells 109 to be sucked in through the nozzles 126 into the cavity 125 in block 835. In block 840, a determination is made as to whether additional fluid removal is needed. For example, the master controller 106 determines the current level of water in the cells of the industrial cart 104 with the predetermined level of water for the seed carried in the industrial cart 104. The master controller 106 determines that additional fluid removal is needed if it is determined that the current level of water is higher than the predetermined level of water.

If it is determined that additional fluid removal is needed, the process repeats block 830. If it is determined that additional fluid removal is not needed, the process proceeds to block 845. In block 845, the master controller 106 reduces or cuts off the removal of fluid from the fluid removal manifold 120. As a result, in block 850, the partial vacuum within the fluid removal manifold 120 decreases (i.e., the pressure increases), which causes the vacuum pressure applied to the biasing assembly to drop, thereby closing the valves 131 and shutting off the uptake of fluid from the cells 109. In block 855, the industrial cart 104 continues to move forward on the track 102 within the assembly line grow pod.

As illustrated above, various embodiments for removing fluid from industrial carts in a grow pod are disclosed. The fluid removal system includes a track, a cart configured to move on the track, a fluid removal manifold provided over the track, and a controller. The cart includes one or more cells. The fluid removal manifold includes a body, and one or more nozzles attached to the body. The controller determines whether fluid in the cart needs to be removed, operates the fluid removal manifold to align the one or more nozzles with the one or more cells of the cart in response to determination that the fluid in the cart needs to be removed, and instructs the fluid removal manifold to remove fluid from one or more cells of the cart through the one or more nozzles. The fluid removal system removes excessive water and/or contaminants from carts moving in an assembly line grow pod, which enhances productivity and quality of plants grown in the assembly line grow pod. Additionally, the fluid removal system controls the level of fluid based on the type of seeds or plants carried in carts.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for harvesting plants. It should also be understood that these embodiments are merely exemplary and are not intended to limit the scope of this disclosure.

What is claimed is:

1. A fluid removal system in an assembly line grow pod, the fluid removal system comprising:
    a track;
    a cart configured to move on the track, the cart including one or more cells, the one or more cells having one or more seeds or plants therein;
    a fluid removal manifold provided over the track, and the fluid removal manifold comprising:
        a body; and
        one or more nozzles connected to the body; and
    a controller comprising:
        one or more processors;
        one or more memory modules; and
        machine readable instructions stored in the one or more memory modules that, when executed by the one or more processors, cause the controller to:
            determine whether fluid in the cart needs to be removed;
            operate the fluid removal manifold to align the one or more nozzles above and into the one or more cells of the cart in response to determination that the fluid in the cart needs to be removed; and
            instruct the fluid removal manifold to remove fluid from the one or more cells of the cart through the one or more nozzles.

2. The fluid removal system of claim 1, wherein the fluid removal manifold comprises:
    a cavity;
    one or more valves; and
    one or more biasing assemblies, each of one or more biasing assemblies being coupled to each of the one or more valves.

3. The fluid removal system of claim 2, wherein the fluid removal manifold comprises one or more tension rings configured to control an amount of force exerted by the one or more biasing assemblies.

4. The fluid removal system of claim 2, wherein the fluid removal manifold comprises a vacuum pump configured to generate a partial vacuum within the cavity.

5. The fluid removal system of claim 4, wherein the machine readable instructions stored in the one or more memory modules, when executed by the one or more processors, cause the controller to instruct the vacuum pump to generate the partial vacuum within the cavity in response to determination that the fluid in the cart needs to be removed.

6. The fluid removal system of claim 1, further comprising a robot arm, wherein the fluid removal manifold is connected to the robot arm, and the robot arm is configured to move the fluid removal manifold relative to the track.

7. The fluid removal system of claim 1, further comprising a robot arm,
wherein the robot arm is connected to the track and movable along the track.

8. The fluid removal system of claim 1, wherein the one or more cells include a fluid sensor configured to detect a level of fluid in the one or more cells, and
the machine readable instructions stored in the one or more memory modules, when executed by the one or more processors, cause the controller to:
receive the level of fluid from the fluid sensor;
determine whether the level of fluid is greater than a threshold fluid level; and
determine that the fluid in the cart needs to be removed in response to determination that the level of fluid is greater that the threshold fluid level.

9. The fluid removal system of claim 1, wherein the one or more cells include a fluid sensor configured to detect a level of fluid in the one or more cells, and
the machine readable instructions stored in the one or more memory modules, when executed by the one or more processors, cause the controller to:
receive the level of fluid from the fluid sensor;
identify a seed in the cart;
retrieve a threshold fluid level for the identified seed; and
determine that the fluid in the cart needs to be removed in response to determination that the level of fluid is greater that the threshold fluid level.

10. The fluid removal system of claim 1, wherein the fluid removal manifold is configured to move in a same direction as the cart when the fluid removal manifold removes fluid from the one or more cells of the cart through the one or more nozzles.

11. A controller programmed to remove fluid from a cart in an assembly line grow pod, the controller comprising:
one or more processors;
one or more memory modules; and
machine readable instructions stored in the one or more memory modules that, when executed by the one or more processors, cause the controller to:
instruct the cart to move on a track;
determine whether fluid in the cart needs to be removed;
align one or more nozzles of a fluid removal manifold above and into one or more cells of the cart in response to determination that the fluid in the cart needs to be removed, the one or more cells having one or more seeds or plants therein; and
instruct the fluid removal manifold to remove fluid from the one or more cells of the cart through the one or more nozzles of the fluid removal manifold.

12. The controller of claim 11, wherein the fluid removal manifold comprises:
a cavity;
one or more valves; and
one or more biasing assemblies, each of one or more biasing assemblies being coupled to each of the one or more valves.

13. The controller of claim 12, wherein the fluid removal manifold comprises a vacuum pump configured to generate a partial vacuum within the cavity.

14. The controller of claim 13, wherein the machine readable instructions stored in the one or more memory modules, when executed by the one or more processors, cause the controller to instruct the vacuum pump to generate the partial vacuum within the cavity in response to determination that the fluid in the cart needs to be removed.

15. The controller of claim 11, wherein the one or more cells include a fluid sensor configured to detect a level of fluid in the one or more cells, and
the machine readable instructions stored in the one or more memory modules, when executed by the one or more processors, cause the controller to:
receive the level of fluid from the fluid sensor;
determine whether the level of fluid is greater than a threshold fluid level; and
determine that the fluid in the cart needs to be removed in response to determination that the level of fluid is greater that the threshold fluid level.

16. The controller of claim 11, wherein the one or more cells include a fluid sensor configured to detect a level of fluid in the one or more cells, and
the machine readable instructions stored in the one or more memory modules, when executed by the one or more processors, cause the controller to:
receive the level of fluid from the fluid sensor;
identify a seed in the cart;
retrieve a threshold fluid level for the identified seed; and
determine that the fluid in the cart needs to be removed in response to determination that the level of fluid is greater that the threshold fluid level.

17. A method of removing fluid from a cart in a grow pod system, the method comprising:
sending, by a controller of the grow pod system, an instruction for moving the cart on a track;
determining, by the controller of the grow pod system, whether fluid in the cart needs to be removed;
aligning, by the controller of the grow pod system, one or more nozzles of a fluid removal manifold above and into one or more cells of the cart in response to determination that the fluid in the cart needs to be removed, the one or more cells having one or more seeds or plants therein; and
removing, by the fluid removal manifold, fluid from the one or more cells of the cart through the one or more nozzles.

18. The method of claim 17, further comprising generating, by a vacuum pump, a partial vacuum within a cavity of the fluid removal manifold in response to determination that the fluid in the cart needs to be removed.

19. The method of claim 17, further comprising:
measuring, by a fluid sensor in a cell of the cart, a level of fluid;
determining, by the controller of the grow pod system, whether the level of fluid is greater than a threshold fluid level; and
determining, by the controller of the grow pod system, that the fluid in the cart needs to be removed in response to determination that the level of fluid is greater that the threshold fluid level.

20. The method of claim 17, further comprising:
measuring, by a fluid sensor in a cell of the cart, a level of fluid;
identifying, by the controller of the grow pod system, a seed in the cart;
retrieving, by the controller of the grow pod system, a threshold fluid level for the identified seed; and
determining, by the controller of the grow pod system, that the fluid in the cart needs to be removed in response to determination that the level of fluid is greater that the threshold fluid level.

\* \* \* \* \*